United States Patent Office 3,013,014
Patented Dec. 12, 1961

3,013,014
PARA CARBALKOXY-β-MORPHOLINO BUTYRANILIDES
Arthur Ernest Wilder Smith, 18 Chemin des Lilas Blancs, Geneva, Switzerland
No Drawing. Filed June 25, 1959, Ser. No. 822,763
Claims priority, application Great Britain July 2, 1958
8 Claims. (Cl. 260—247.2)

This invention is concerned with new chemical compounds having outstanding anaesthetic properties.

Many compounds have been proposed for use as local anaesthetics which can very broadly be described as dialkylaminoalkyl substituted acetanilides or close analogues thereof. Such a compound is, for example, lignocaine. Much research has been directed to finding compounds of this general type which have superior properties from the anaesthetic point of view, that is have high anaesthetic power and low toxicity.

In British specification No. 801,405 there have been described new compounds of anaesthetic activity having the general formula:

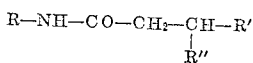

where R is an unsubstituted phenyl group or a phenyl group substituted in the ring by one or more chlorine atoms, and if desired by other substituents, R' is hydrogen or an alkyl radical containing from 1–5 carbon atoms, and R'' is a pyrroline or pyrrolidino group and non-toxic salts of such compounds as defined therein.

It has now been found that compounds of the general formula:

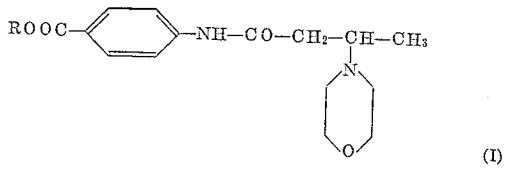

(in which R represents an alkyl group and in which the phenylene group may be further substituted by other substituents, such as alkyl groups) as well as non-toxic salts of such compounds, have an outstanding anaesthetic activity, having high activity, low toxicity and giving rise to very little irritation on administration.

According to the invention, therefore, there are provided as new compounds, compounds of general Formula I specified above and non-toxic salts thereof.

As examples of non-toxic salts may be mentioned the hydrochlorides, sulphates, phosphates, tartrates and citrates of the compounds of the general Formula I above.

Those compounds are preferred in which the group R is a lower alkyl group containing from 1–10 carbon atoms, particularly from 1–4 carbon atoms, for example in which the group R is a methyl, ethyl, n-propyl, iso-propyl, n-butyl, iso-butyl, sec-butyl or tert-butyl group. Where the phenylene group is substituted, those compounds are preferred in which the substituents are alkyl groups. In particular, mono- or dialkyl substituted compounds are preferred on account of their favourable properties.

One of the new compounds according to the invention in which the phenylene group is unsubstituted and which shows marked anaesthetic activity is N-(β-morpholino)-butyryl-p-amino benzoic acid-n-butyl ester. Other specific new compounds are those specified at the end of the example below.

The new compounds according to the invention can be prepared by any convenient method. A suitable method is, for example, to react morpholine with the appropriate crotonic anilide of the general formula:

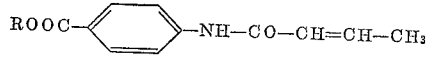

(in which R has the above-stated meaning and in which the phenylene group may be substituted). The reaction may be conveniently effected at an elevated temperature, and under pressure, although this need not be necessary. Thus, the reaction can be conveniently effected by refluxing the reaction components together. When the reaction is complete any excess of morpholine can be distilled off under reduced pressure, and the product extracted from the residue in any convenient manner. Thus, the product can be dissolved in an organic solvent, for example, ethyl alcohol, and then isolated as the free base or as a salt thereof, for example, the hydrochloride.

The compounds according to the invention can be formulated in any convenient manner for administration, which is preferably carried out by injection. Thus preparations suitable for injection may be prepared for example by dissolving the compounds according to the invention, in water-soluble form, e.g. as their non-toxic salts, in pyrogen-free water.

The new compounds according to the present invention are chemically very stable, which is an advantage from the point of view of heat sterilisation, and are readily prepared. The compounds of the present invention also have excellent toxicity and tolerance properties.

In order that the invention may be well understood the following example is given by way of illustration only.

*Example*

20 g. of N-crotonyl-p-amino benzoic acid n-butyl ester are refluxed for 8 hours with 200 ml. of morpholine and the excess morpholine is then distilled off under reduced pressure, care being taken to avoid overheating. The residue is then dissolved in ethanol and poured into an excess of dilute hydrochloric acid, clear solution demonstrating complete reaction. On the addition of ammonia, the free base crystallised and was filtered off and recrystallised from aqueous methanol. Yield 21 g., M.P.=82–83° C. The anaesthetic activity of the compound was the same order as that of "percaine" (2-butoxy-N-(2-diethyl)-aminoethyl-cinchoninamide hydrochloride) both in infiltration and surface anaesthesia as judged by experiments on guinea pigs. The compound has an $LD_{50}$ of 1100 mgs./kg. on subcutaneous administration in the mouse.

N-crotonyl-p-amino benzoic acid n-butyl ester may, for example, be prepared as follows. 11.6 g. of n-butyl (p-amino) benzoate are dissolved in 150 ml. of acetone and 5.2 g. of sodium bicarbonate added. 5.3 g. of crotonyl chloride are added with stirring and the solution boiled for five minutes under reflux, and then poured into an excess of dilute hydrochloric acid. The product which precipitates is filtered and recrystallised from aqueous ethyl alcohol. Yield 11.2 g.; M.P. 84–87° C.

In a similar manner the following compounds have been prepared:

N-(β-morpholino)-butyryl-p-amino benzoic acid methyl ester; M.P. (as hydrochloride) 204–5° C.
N-(β-morpholino)-butyryl-p-amino benzoic acid ethyl ester; M.P. 103–5° C.
N-(β-morpholino)-butyryl-p-amino benzoic acid n-propyl ester; M.P. (as hydrochloride) 180–3° C.
N-(β-morpholino)-butyryl-p-amino benzoic acid iso-propyl ester; M.P. (as hydrochloride) 213–4° C.
N-(β-morpholino)-butyryl-p-amino benzoic acid iso-butyl ester; M.P. 125–6° C.

I claim:
1. A compound selected from the group consisting of compounds of the formula:

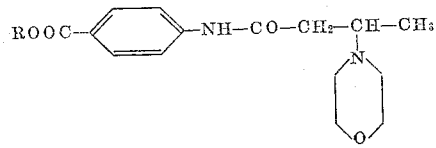

where R is an alkyl of 1–10 carbon atoms and non-toxic salts thereof.

2. N-(β-morpholino)-butyryl-p-amino benzoic acid n-butyl ester.
3. N-(β-morpholino)-butyryl-p-amino benzoic acid methyl ester.
4. N-(β-morpholino)-butyryl-p-amino benzoic acid ethyl ester.
5. N-(β-morpholino)-butyryl-p-amino benzoic acid n-propyl ester.
6. N-(β-morpholino)-butyryl-p-amino benzoic acid isopropyl ester.
7. N-(β-morpholino)butyryl-p-amino benzoic acid isobutyl ester.
8. A compound as claimed in claim 1, which is a salt selected from the group consisting of the hydrochloride, the sulphate, the phosphate, the tartrate and the citrate.

References Cited in the file of this patent
UNITED STATES PATENTS

| | | |
|---|---|---|
| 2,823,209 | Martin | Feb. 11, 1958 |
| 2,914,522 | Hiltmann et al. | Nov. 24, 1959 |
| 2,921,077 | Hiltmann et al. | Jan. 12, 1960 |

FOREIGN PATENTS

| | | |
|---|---|---|
| 726,864 | Great Britain | Mar. 23, 1955 |

OTHER REFERENCES

Smith et al.: Helv. Chimica Acta, vol. 38, pages 1085–1095 (1955).